(No Model.)
A. B. DISS.
MOLD FOR FORMING ARTICLES OF CELLULOID AND OTHER PLASTIC MATERIALS.
No. 278,321. Patented May 29, 1883.
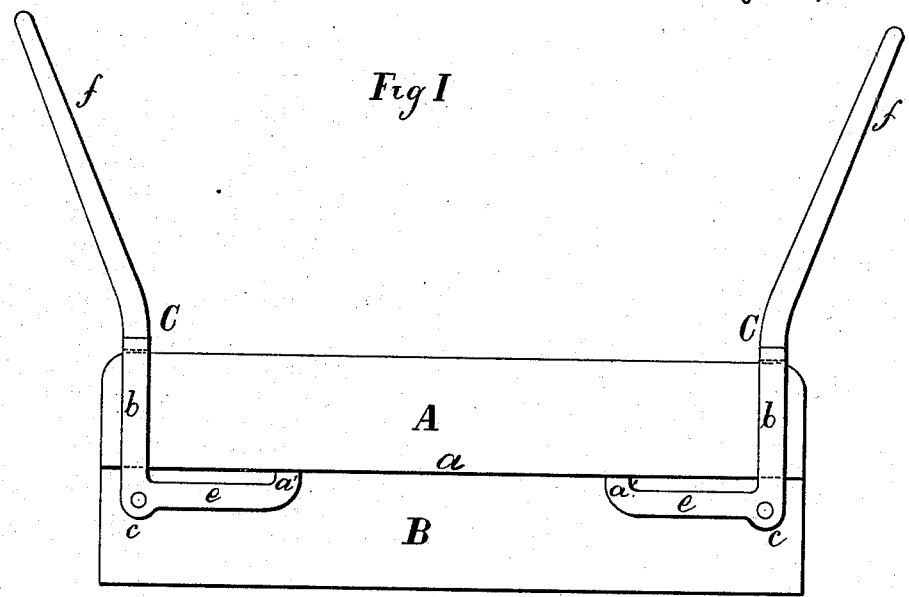
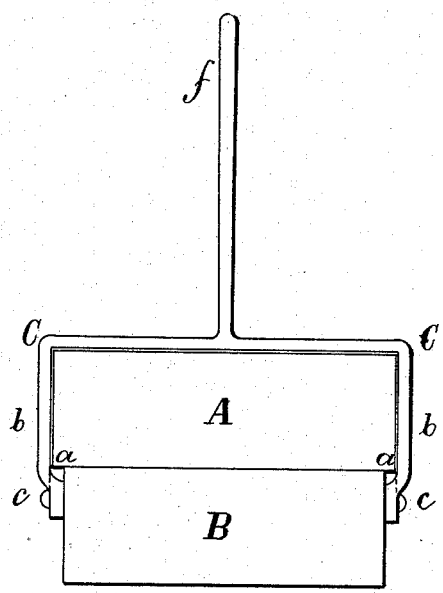
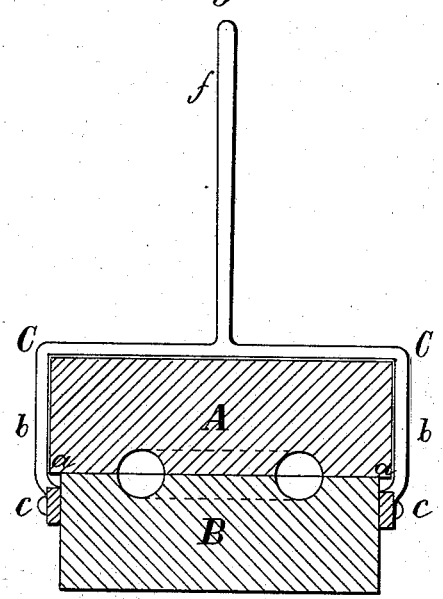
Witnesses
Rudolf H. Rjellman
Thomas E. Crossman
Inventor
Albert B Diss
per James A. Whitney
Attorney

UNITED STATES PATENT OFFICE.

ALBERT B. DISS, OF BROOKLYN, NEW YORK.

MOLD FOR FORMING ARTICLES OF CELLULOID AND OTHER PLASTIC MATERIALS.

SPECIFICATION forming part of Letters Patent No. 278,321, dated May 29, 1883.

Application filed October 16, 1882. (No model.)

*To all whom it may concern:*

Be it known that I, ALBERT B. DISS, of Brooklyn, in the county of Kings and State of New York, have invented certain Improvements in Molds for Forming Articles of Celluloid and other Plastic Material, of which the following is a specification.

In the manufacture of celluloid the material, in a warm and consequently in a plastic condition, is placed in the cavities of molds formed in coincident halves or portions, and then placed under a press, which compresses the material to the form of the article. In order to secure sufficient rapidity in the manufacture, it is usual to make these molds of sufficient size as to comprise a large number of the cavities, thereby simultaneously forming a considerable number of the articles. This method is subject to many drawbacks in practice. Thus, for example, the molds themselves, being necessarily large and comprising a comparatively great quantity of metal, cool slowly, which consumes much time. Furthermore, being heavy and bulky, they are difficult to manipulate.

The object of my invention is to obviate these drawbacks by providing a molding apparatus which shall be simple, light, easily manipulated, and to a certain extent self-acting; and to this end my said invention comprises certain novel combinations of parts, whereby the objects aforesaid are effectually secured.

Figure 1 is a side view, representing a mold constructed according to my said invention. Fig. 2 is an end view, and Fig. 3 a vertical transverse sectional view of the same.

A and B are, respectively, the upper and lower parts of the mold. Within these two parts are formed the cavities of the mold in which the plastic material is to be brought to shape by the compression of one of the said parts upon the other. Inasmuch as the shape of these cavities will depend upon that desired to be given to the article to be made, and inasmuch as they do not materially differ in character from those in common use, in the ordinary molds hereinbefore referred to, special description of said cavities is here unnecessary, it being premised, however, that it is intended in practice that each mold shall be constructed to form a single article at a time, instead of several articles simultaneously, thereby enabling the mold to be made proportionally smaller as compared with the molds heretofore in use and hereinbefore mentioned. The sides of the upper part, A, of the mold are projected laterally beyond the corresponding sides of the lower part, B, the said mold thereby forming shoulders *a*, which, if desired, could be replaced by lateral flanges serving the same purpose. At each end of the lower part, B, is a forked lever, C, the branches *b* of which are placed astride of said end of the mold. These branches *b* are pivoted to the lower part, B, as shown at *c*, and have their lower extremities brought to a horizontal position to form the lower arms, *e*, of the levers, the upper arms being shown at *f*. The lower arms, *e*, of said levers C have formed at the inner sides of their extreme end portions shoulders *a'*, which are arranged underneath the laterally-projecting portions or shoulders *a* of the upper part, A, of the mold. The cross-bars *g* of the lever C are so arranged that when the main portions of the branches *b* are brought vertical the said cross-bars will be brought across and upon the top of the adjacent end of the upper part, A, of the mold, thereby holding the two together, the branches *b* and cross-bar *g* constituting, in fact, a yoke at each end of the mold, which, when in position as just described, retains the two parts of the mold in their requisite snug and close position or relation with each other. By operating the lever C to bring the cross-bar *g* away from the upper part, A, of the mold, the said upper part will be released, and simultaneously with this the shoulders *a'*, acting on the portions or shoulders *a* of the upper part, A, of the mold, will lift the latter clear of the lower part, to facilitate the removal of the object or article formed or shaped in the cavities of the said mold. In the use and operation of the invention the cavities of the mold are filled with the celluloid or other suitable material in a plastic condition, the part A being then superposed upon the part B and the two together placed underneath a suitable press, which will act upon the upper part, A, without interfering with the inward swing or movement of the lever C, as just hereinafter explained. This pressure compresses the material to shape within the cavities of the mold and compresses the part A down upon the part B, whereupon the portions or shoulders $a$, bearing upon the shoulders $a'$ of the lever C, swing the arm $e$ downward, and consequently swing the vertical portions of the branches $b$, and also the cross-pieces $g$, inward until the said cross-pieces $g$ are brought over and upon the end portions of the part A, thereby firmly locking the said part tightly upon the part B, which done, the mold, instead of being left in the press a sufficient time to cool, may be taken out forthwith and immersed in cold water or otherwise suitably treated to reduce its temperature, the two parts of the mold being meanwhile firmly held together. When the mold becomes sufficiently cool, the levers C are operated to release the one part, A, from the other part, B, and thereby permitting the removal of the article or object formed therein, and the further immediate use of the same mold for a repetition of the operation.

In addition to the advantages hereinbefore set forth as arising from the use of my said invention, there is the further one that an ordinary rapidly-acting power-press may be used in place of the slow manually-operated screw-press hitherto employed for pressing the two halves of the ordinary mold, this advantage of my said invention being due to the fact that the two halves of the mold are automatically yoked or secured together, when the one is pressed downward upon the other, thereby avoiding the necessity which exists with the ordinary press and molds of leaving the molds in the press long enough to permit the cooling of the molds and their contents.

What I claim as my invention is—

1. The combination, with the parts A B of a mold, of mechanical means, substantially as described, for automatically locking together the parts of the mold when the said parts are pressed one upon another, substantially as and for the purpose herein set forth.

2. The mold composed of the two sections A B, one of which is provided with lateral shoulders or flanges $a$, and the forked lever C, having arms $e$ pivoted to the lower part, B, and arranged to act in conjunction with the shoulders or flanges $a$ of the upper part, A, substantially as and for the purpose herein set forth.

ALBERT B. DISS.

Witnesses:
THOMAS E. CROSSMAN,
RUDOLF H. RJELLMAN.